(12) United States Patent
Jaeger

(10) Patent No.: US 6,571,753 B1
(45) Date of Patent: Jun. 3, 2003

(54) PASSIVE AIR VENT FOR A MARINE ENGINE

(75) Inventor: Matthew W. Jaeger, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/102,275

(22) Filed: Mar. 20, 2002

(51) Int. Cl.[7] ............................................. F01P 11/02
(52) U.S. Cl. ...................................................... 123/41.14
(58) Field of Search ..................................... 123/41.14

(56) References Cited

U.S. PATENT DOCUMENTS

| | | | |
|---|---|---|---|
| 2,408,183 A | * 9/1946 | Wood | 123/41.14 |
| 4,513,784 A | 4/1985 | Farrand et al. | 137/854 |
| 5,173,033 A | 12/1992 | Adahan | 417/234 |
| 5,816,430 A | 10/1998 | Gruber | 220/367 |
| 5,826,554 A | 10/1998 | Kuhnel et al. | 123/184 |
| 5,893,609 A | 4/1999 | Schmidt | 297/284 |
| 5,944,211 A | 8/1999 | Woodnorth et al. | 220/203 |
| 6,050,867 A | 4/2000 | Shields et al. | 440/88 |
| 6,135,064 A | 10/2000 | Logan et al. | 123/41 |
| 6,343,965 B1 | 2/2002 | Biggs et al. | 440/88 |

* cited by examiner

Primary Examiner—Noah P. Kamen
(74) Attorney, Agent, or Firm—William D. Lanyi

(57) ABSTRACT

An engine coolant draining system is provided with a vent module that is shaped to be inserted into the coolant conduit of a marine engine. The vent module comprises an umbrella-shaped valve which operates as an unidirectional valve to allow air to flow into the coolant conduit from the region external to the coolant conduit, but prevents liquid from flowing out of the coolant conduit through the vent module when the pressure within the coolant conduit is greater than atmospheric pressure external to the vent module.

20 Claims, 4 Drawing Sheets

PASSIVE AIR VENT FOR A MARINE ENGINE

BACKGROUND OF THE INVENTION

1. Field of the Invention

The present invention is generally related to an engine coolant draining system of a marine engine and, more particularly, to the use of a unidirectional air valve as a passive air vent to allow air to flow into a coolant conduit when a liquid coolant is being drained from the cooling system of the engine.

2. Description of the Prior Art

Many different systems are known to those skilled in the art for draining or flushing marine engine cooling systems. In addition, various types of unidirectional valves are known to those skilled: in the art.

U.S. Pat. No. 6,135,064, which issued to Logan et al on Oct. 24, 2000, discloses an engine drain system. An engine cooling system is provided with a manifold that is located below the lowest point of the cooling system of the engine. The manifold is connected to the cooling system of the engine, a water pump, a circulation pump, the exhaust manifolds of the engine, and a drain conduit through all of the water can be drained from the engine.

U.S. Pat. No. 6,343,965, which issued to Biggs et al on Feb. 5, 2002, discloses a pneumatically actuated marine engine water drain system. A drain system for a marine vessel is provided which includes one or more pressure actuated valves associated with the coolant water drain system. The boat operator is provided with a pressure controller that allows pressure to be introduced into the system for the purpose of actuating the drain valves and, as a result, opening various drain conduits to allow cooling water to drain from the engine cooling system into the bilge or overboard.

U.S. Pat. No. 6,050,867, which issued to Shields et al on Apr. 18, 2000, discloses a drain system for a marine vessel. The drain system is provided for a marine vessel in which three types of drain operations can be performed at one common location near the transom of the marine vessel. A multiple conduit structure is provided with a plurality of fluid passages extending at least partially through its structure. A first fluid passage allows the bilge of the boat to be drained. A second fluid passage allows multiple locations on the engine to be drained through a common port. A second sealing plug is provided to close the second passageway that prevents fluid communication between the various fluid conduits used to drain the cooling water of the engine. A third fluid passage is provided through the multiple conduit structure to allow lubricating oil to be drained from the engine. A single hole through the transom of a boat is all that is required to allow the multiple conduit structure to be attached to the boat and extend through the transom for the purpose of draining the bilge, the engine cooling water, and the engine lubricating fluid.

U.S. Pat. No. 5,944,211, which issued to Woodnorth et al on Aug. 31, 1999, describes a container system including an air evacuation valve. The container system includes a one-piece, one-way valve. The container system can be evacuated by pressing the lid, thereby forcing air out of the one-way valve. The one-way valve does not allow air to enter the container system. The one-way valve includes an interface or release which allows air to enter the container system when the interface is pressed. The one-way valve is preferably an umbrella-shaped valve made of silicone or plastic.

U.S. Pat. No. 5,893,609, which issued to Schmidt on Apr. 13, 1999, describes an air pumping system for an automotive seat. An inflatable lumbar support system for a vehicle seat includes an inflatable air cell, or cells, coupled by an air line to a motorized diaphragm pump. The outlet valve of the pump is in the form of an umbrella valve which serves not only to seal the pump on the intake strokes, but is of such character to provide the sole seal between the air cell and pump, thereby eliminating the need to have a separate external check valve between the pump and air cell to assure that the air cell does not leak once pressurized.

U.S. Pat. No. 5,826,554, which issued to Kuhnel et al on Oct. 27, 1998, describes pressure relief means for a thin wall air intake pipe for an internal combustion engine. The valve is installed in an opening provided in a thin wall of an air intake pipe, which supplies combustion air from a flow control device to a cylinder of an internal combustion engine, to relieve excess pressure in the pipe. The valve includes a socket connected to a segment of the air intake pipe, and an elastomer, umbrella valve member is supported in the socket to normally cover the opening in the pipe and to undergo deformation when the pressure in the pipe reaches a predetermined value to uncover the opening and to connect the interior of the pipe to the ambient atmosphere.

U.S. Pat. No. 5,816,430, which issued to Gruber on Oct. 6, 1998, describes a fuel tank vent valve for heaters. A jerrycan holds liquid fuel. A cap for the jerrycan includes an air vent valve assembly having an umbrella-shaped check valve. The check valve is sensitive to a pressure differential between an interior of the jerrycan and the atmosphere. As fuel is dispensed from the jerrycan, a volume of an air chamber within the jerrycan increases, thereby decreasing the pressure in the jerrycan and creating a vacuum. The vacuum causes the rate at which fuel is dispensed from the jerrycan to decrease. The check valve dislodges when the pressure within the jerrycan becomes less than the pressure of the atmosphere and additional air is introduced into the jerrycan. The air fills the expanded volume of the air chamber, thereby increasing the pressure, eliminating the vacuum and causing the rate at which fuel is dispensed to increase.

U.S. Pat. No. 5,173,033, which issued to Adahan on Dec. 22, 1992, describes a one-way umbrella valve and portable fluid pumping device including same. The portable fluid pumping device includes a valve assembly having a pair of one-way umbrella valves controlling the flow of air to produce a positive pressure at one port and a negative pressure at another port. Each umbrella valve includes a valve stem having a neck received within the mounting opening, and an umbrella skirt integrally joined to the neck to overlie the valve opening. The umbrella skirt is relatively thin for its complete extent, and the juncture between the umbrella skirt and neck of the valve stem is of frusto-conical configuration increasing in diameter from the neck to the umbrella skirt.

U.S. Pat. No. 4,513,784, which issued to Farrand et al on Apr. 30, 1985, describes a check valve assembly. The assembly is disclosed having a valve chamber with an inlet port and an outlet port. An elastomeric umbrella valve is contained in the chamber between the ports and is attached by an integral stem in a preloaded condition to normally close the inlet port and be deflectable in response to differential fluid pressure acting in one direction to open same to permit forward fluid flow there through past the valve and through the chamber to the outlet port. An inwardly projecting retention arrangement formed in the chamber retains the valve in operational relationship with the inlet port in the event the valve becomes unattached so that any backward flow from the outlet port still forces closure of the valve on same. A bypass channel arrangement also formed in the chamber maintains forward fluid flow past the valve to the outlet port in the event the valve becomes unattached.

The patents described above are hereby expressly incorporated by reference in the description of the present invention.

It would be significantly beneficial if a draining system for a marine engine could be provided with a device that inhibits the creation of a vacuum within the cooling system when coolant is drained from the system.

SUMMARY OF THE INVENTION

An engine coolant draining system, made in accordance with the preferred embodiment of the present invention, comprises an internal combustion engine and a coolant conduit disposed at least partially in thermal communication with heat producing portions of the internal combustion engine. In most cases, the coolant conduit comprises hoses attached to the internal combustion engine and also cavities formed in various parts of the engine and its exhaust system. A coolant, such as water, is circulated through the coolant conduit in order to remove heat from the engine and its associated components. It should be understood that some marine engines are configured to be directly cooled by lake or sea water circulated through the hoses and engine cavities to directly remove heat from heat producing regions of the engine. Alternative configurations provide a closed cooling system in which a first liquid, such as ethylene glycol, is circulated in direct thermal communication with the heat producing portions of the engine and a second liquid, such as water, is circulated in thermal communication with the first liquid in a heat exchanger. The second liquid, which is typically sea or lake water, is drawn from the body of water in which the marine vessel is operated and circulated through the heat exchanger to remove heat from the closed cooling liquid, such as ethylene glycol. The water is then returned to the sea or lake from which it was drawn.

A unidirectional air valve, in a preferred embodiment of the present invention, is disposed in fluid communication with the coolant conduit to inhibit flow from flowing out of the coolant conduit through the unidirectional air valve while allowing fluid to flow into the coolant conduit through the unidirectional air valve. The unidirectional air valve either inhibits or allows fluid flow through its construction as a result of the differential pressure across the valve.

The present invention can further comprise a housing structure, such as a thermostat housing connected in fluid communication with the coolant conduit. The unidirectional air valve is attached to the housing structure in order to dispose the unidirectional air valve in fluid communication with the coolant conduit. The coolant conduit is configured to conduct water in thermal communication with the heat producing portions of the internal combustion engine. The system can further comprise a water pump connected in fluid communication with the coolant conduit for causing liquid coolant to flow through the coolant conduit. The unidirectional air valve, in a particularly preferred embodiment of the present invention, is an umbrella-shaped valve.

In certain embodiments, a vent module is provided and shaped to be inserted into the coolant conduit, preferably in association with the housing structure. The housing structure can be a thermostat housing structure associated with the internal combustion engine. The vent module is shaped to support the unidirectional air valve in fluid communication with the coolant conduit. A screen member can be disposed within the vent module in order to inhibit debris from flowing into contact with an operative portion of the unidirectional air valve. The unidirectional air valve or umbrella-shaped valve, is responsive to the pressure differential between the pressure within the coolant conduit and the pressure external to the coolant conduit. The unidirectional air valve inhibits fluid from flowing out of the coolant conduit through the unidirectional air valve when the pressure within the coolant conduit is higher than the pressure external to the coolant conduit and allows fluid to flow into the coolant conduit through the unidirectional air valve when the pressure external to the coolant conduit is higher than the pressure within the coolant conduit.

The present invention facilitates the draining of water from the cooling system of the internal combustion engine by allowing air to flow into an upper region of the coolant conduit in order to prevent the formation of a vacuum that would otherwise adversely affect the proper draining of water from the cooling system of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
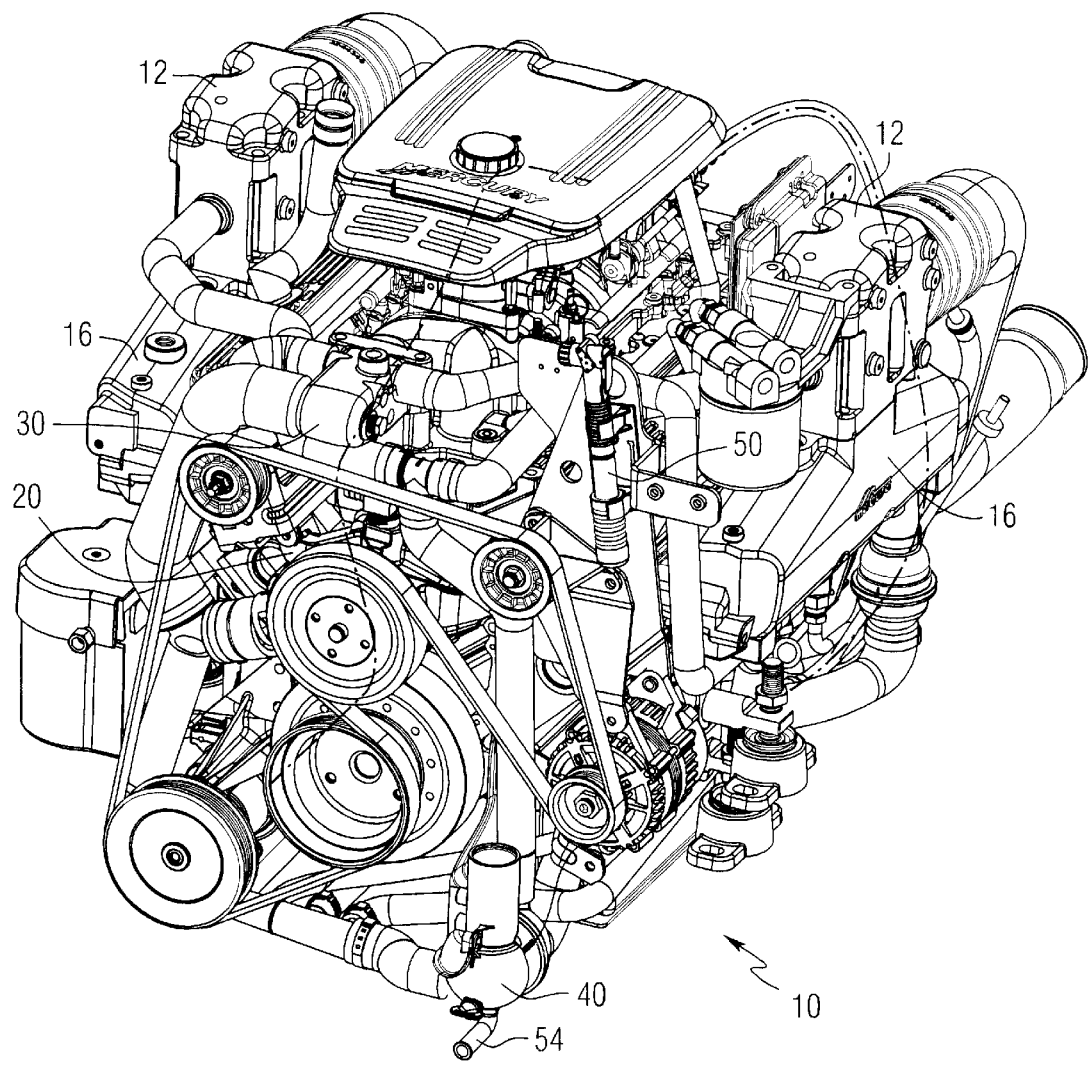
FIG. 1 is an isometric view of an inboard marine engine.

Throughout the description of the preferred embodiment of the present invention, like components will be identified by like reference numerals.

FIG. 1 is an isometric representation of a marine engine 10. For purposes of reference, the marine engine is provided with exhaust elbows 12, exhaust manifolds 16, a water recirculation pump 20, a thermostat housing 30, and a water distribution housing 40. As can be seen in FIG. 1, the thermostat housing 30 has several fluid conduits connected in fluid communication with it. In a typical application, a thermostat located within thermostat housing controls the flow of coolant liquid through the coolant conduits during engine warm up and, later, during normal operation to allow sufficient coolant liquid to be circulated in thermal communication with heat producing regions of the engine 10. The water distribution housing 40 is connected with the coolant conduit and with a water pump that draws water from a body of water in which the marine engine is operating.

The marine engine 10 shown in FIG. 1 is provided with a pneumatically operated drain system in which a hand pump 50, or any other source of air pressure, can be used to raise the pressure within certain pneumatic tubes which activates a drain valve located within the water distribution housing 40. When this is done, cooling water contained within the coolant conduit of the engine 10 can drain from the drain conduit 54.

When water is allowed to drain from the engine 10 through drain conduit 54, some cooling systems can exhibit a tendency to form a vacuum within the upper portions of the fluid conduits connected to the engine cooling system. The formation of a vacuum in the upper portions of the cooling system adversely affects the rapid draining of water through the drain conduit 54. In known systems, the operator of the marine vessel is typically advised to remove certain plugs from the cooling system to allow air to fill the evacuated volume in the cooling system in order to facilitate the draining of cooling water from the drain conduit 54. However, this procedure requires that the operator of the marine vessel act relatively quickly to remove the suggested plugs in order to avoid the deleterious effect of drawing water, in a siphon effect, upwardly through the water cooled exhaust conduits and possibly into the engine from the body of water in which it is operated. An engine of this type usually stops running with at least one exhaust valve partially open. A vacuum in the cooling system, due to water flowing out of the system, acts to draw water into the exhaust conduit because of the water/exhaust communication in the elbow. If water flows into a cylinder of the engine, a highly deleterious and potentially damaging phenomena known as "hydro-lock" can occur.

Figure 2:
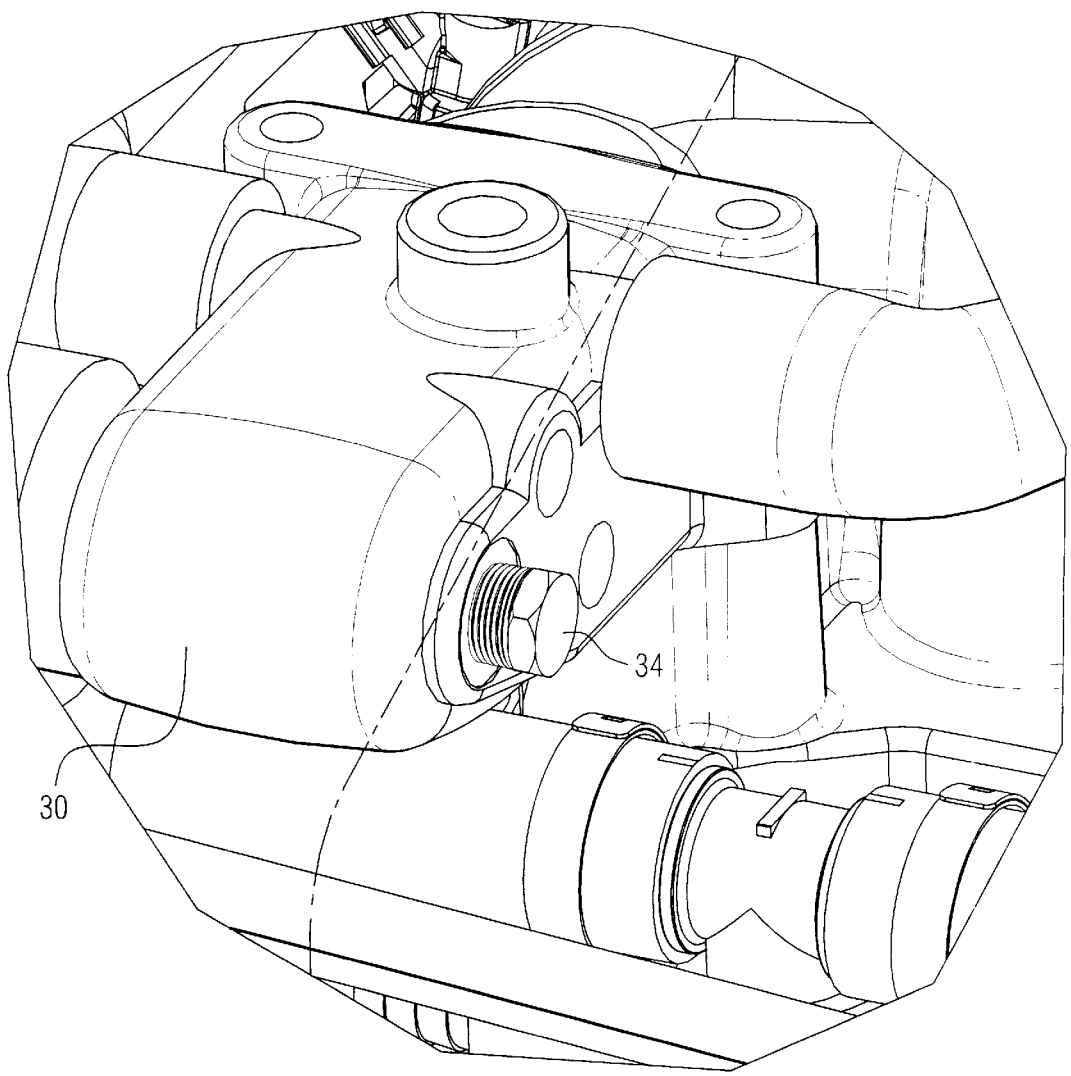
FIG. 2 shows a portion of FIG. 1 in which a thermostat housing is illustrated.

FIG. 2 is an enlarged view of the portion of the engine 10 shown in FIG. 1 immediately surrounding the thermostat housing 30. A vent module 34 is inserted into the thermostat housing 30 in order to address the problem of the tendency to form a vacuum in the upper portions of the cooling system when water is drained from the drain conduit 54 described above.

Figure 3:
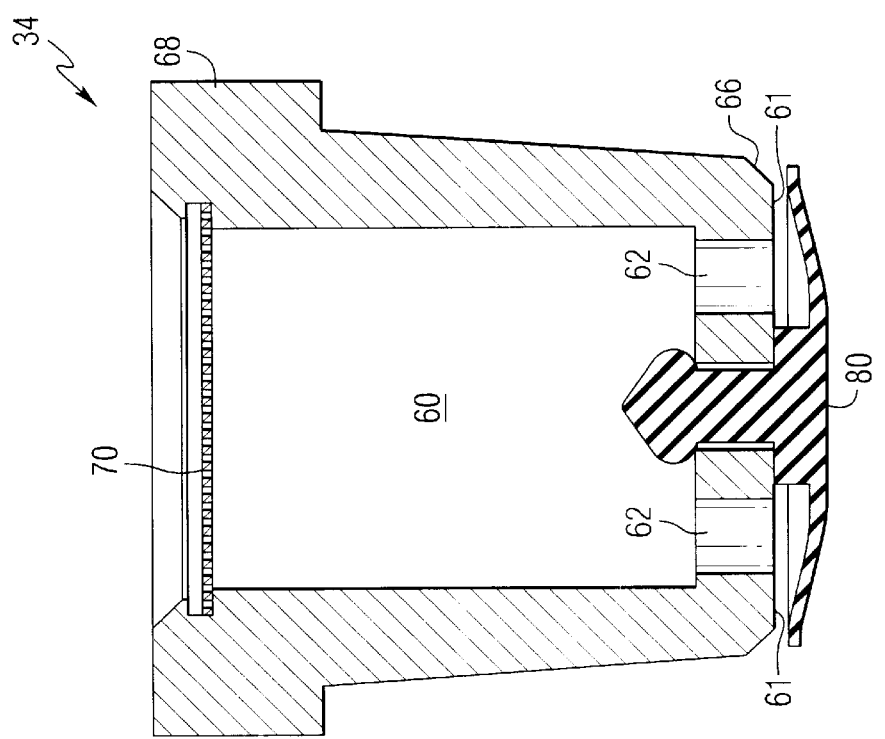
FIG. 3 is a section view of a vent module of the present invention.

FIG. 3 is a section view of the vent module 34 illustrated in FIGS. 1 and 2. The vent module has a central cavity 60 and several air flow holes 62 which connect the cavity 60 in fluid communication with an internal portion of the thermostat housing 30. These air flow holes 62 are located at the inserted end 66 of the vent module 34. The exposed end 68 of the vent module 34 is provided with a hex-shaped cross section that facilitates the vent module being threaded into the thermostat housing 30 or removed therefrom. In the exposed end 68 of the vent module 34, a screen member 70 is provided to prevent debris from entering the cavity 60 and moving into contact with the air flow holes 62 and an umbrella valve 80 which is attached to the inserted end 66 of the vent module 34 and which serves as a unidirectional valve. When the vent module 34 is inserted in the thermostat housing 30, as shown in FIG. 2, the pressure differential between the pressure within the thermostat housing 30 and the atmospheric pressure external to the coolant conduit of the engine determines whether or not a fluid will pass through air flow holes 62. If the internal pressure within the thermostat housing 30 is greater than the atmospheric pressure external to the thermostat housing 30, the unidirectional air valve 80, or umbrella valve will partially collapse against the face 61 of the vent module 34 at the inserted end 66. This will block flow of liquid, from the coolant conduit and thermostat housing 30, into cavity 60. Therefore, when the marine engine 10 is operating, cooling fluid will not flow through the vent module 34 in a direction from the coolant conduit and thermostat housing 30 to the atmosphere. However, if the pressure within the coolant conduit and thermostat housing 30 is reduced to a magnitude less than atmospheric pressure which is external to the thermostat housing 30, air is allowed to flow through the screen member 70, through cavity 60, through air flow holes 62, and into the thermostat housing 30 and coolant conduit. This air flow is not blocked by the umbrella valve 80 and is allowed to flow into the evacuated region in the upper portion of the coolant system. This flow of air into the coolant conduit through the vent module 34 reduces the likelihood that a vacuum will be formed that would otherwise inhibit proper draining of water through the drain conduit 54 shown in FIG. 1.

Figure 4A:
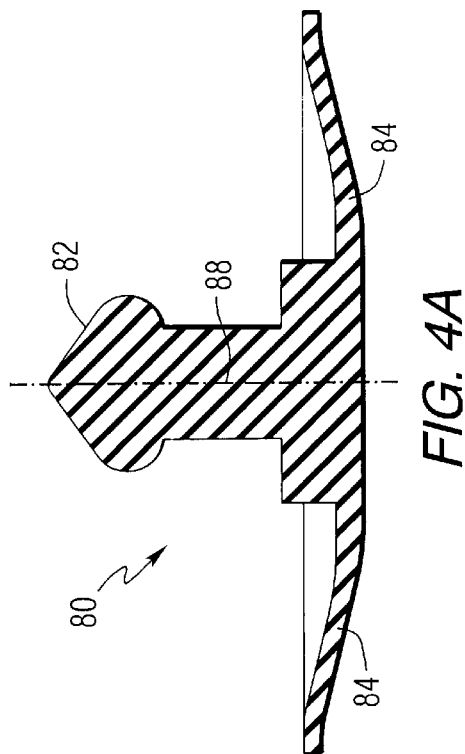
FIGS. 4A and 4B are two alternative views of an umbrella valve used in conjunction with the present invention.

FIG. 4A shows the umbrella valve 80 is section view. A bulbous end 82 is shaped to retain the umbrella valve 80 in place with respect to the inserted end 66 of the vent module 34. The umbrella-shaped portion 84 is flexible and is typically made of a resilient rubber material, such as ethylene propylene. A pressure differential, wherein the pressure inside the coolant conduit is greater than atmospheric pressure, causes the umbrella portion 84 to collapse against the end face at the inserted end 66 of the vent module 3,4 and block holes 62.

Figure 4B:
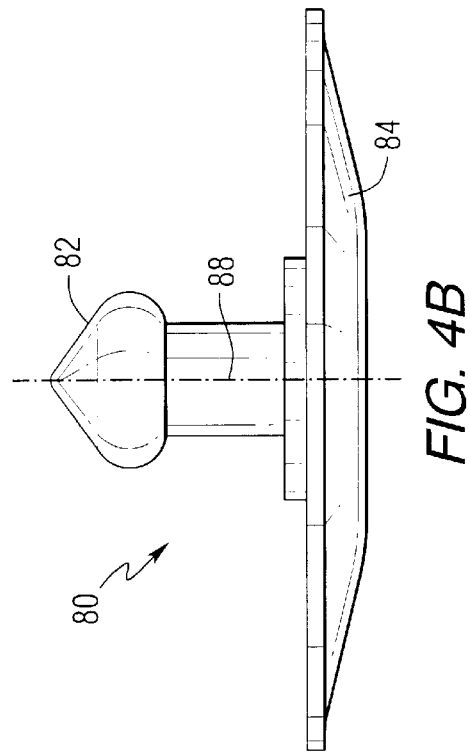

FIG. 4B is a side view of the umbrella valve 80. In FIGS. 4A and 4B, it should be understood that the umbrella valve 80 is generally symmetrical about centerline 88 and, therefore, rotation of the umbrella valve 80 about centerline 88 while within the vent module 34 will not have a deleterious effect on the operation of the system.

Figure 5B:
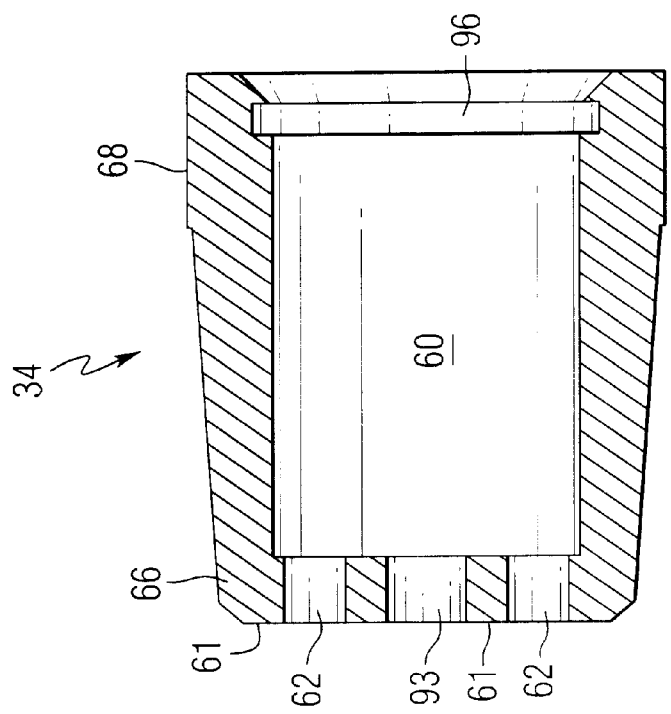
FIGS. 5A and 5B show alternative views of the structure of the vent module of the present invention.
Figure 5A:
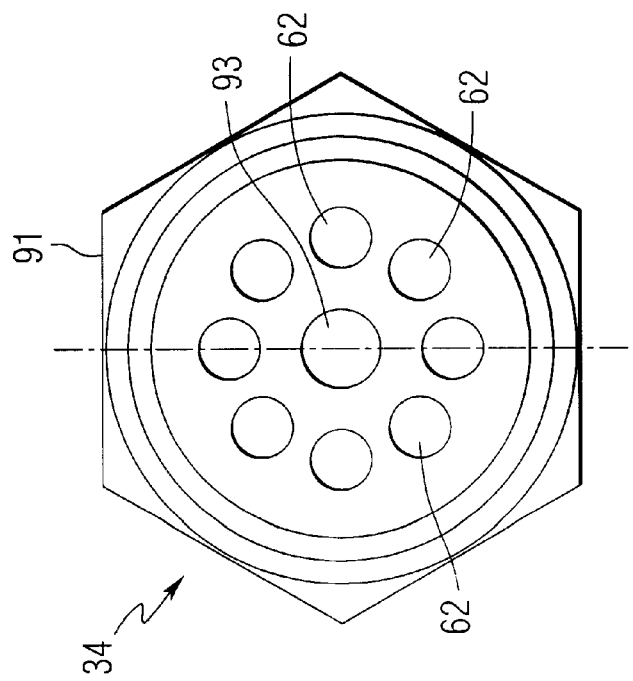

FIGS. 5A and 5B show two alternative views of the vent module 34. In FIG. 5A, the eight air flow holes 62 are shown extending through the inserted end 66 of the vent module 34. Also shown in FIG. 5A is the hex shaped surface 91 of the vent module 34 which facilitates the insertion and removal of the vent module from the thermostat housing 30. The central hole 93 is formed to receive the bulbous end 82 of the umbrella valve 80 as illustrated in FIG. 3. FIG. 5B shows the vent module 34 in cross section with the air flow holes 62 and cavity 60 illustrated. A circular groove 96 is formed in the exposed end 68 and is shaped to receive the screen member 70 which is described above in conjunction with FIG. 3. The screen member 70 prevents debris from flowing, in a direction from right to left in FIG. 5B, into contact with the holes 62 and umbrella valve 80.

With reference to FIGS. 1, 2, 3, 4A, 4B, 5A, and 5B, the present invention operates by allowing air to flow through the screen member 70 and cavity 60 and subsequently through the holes 62 into the coolant conduit and thermostat housing 30. This air replaces the volume evacuated by the draining of liquid through the drain conduit 54. By replacing the evacuated volume of coolant water, the system prevents the formation of a vacuum in the upper portions of the cooling system. This facilitates the rapid draining of water from the cooling system and through the drain conduit 54 and prevents engine damage by assuring that no water enters the engine. When the pressure within the coolant conduit is lower in magnitude than the pressure external to the vent module 34, the umbrella valve 80 is caused to move away from the end face of the vent module 34 at the inserted end 66 to allow air to flow from the internal cavity 60 of the vent module 34 and through air flow holes 62 into the coolant conduit, including the thermostat housing 30. However, when the pressure within the cooling system is greater than atmospheric pressure external to the thermostat housing 30, the umbrella valve 80 deforms and moves into sealing contact with the end face 61 of the vent module 34. This prevents cooling water from flowing into the central cavity 60 by passing through the air flow holes 62.

Although the present invention has been described with specificity and illustrated to show a preferred embodiment, it should be understood that alternative embodiments are also within its scope.

I claim:

1. An engine coolant draining system, comprising:
  an internal combustion engine;
  a coolant conduit disposed at least partially in thermal communication with heat producing portions of said internal combustion engine; and a unidirectional air valve disposed in fluid communication with said coolant conduit to inhibit fluid from flowing out of said coolant conduit through said unidirectional air valve while allowing fluid to flow into said coolant conduit through said unidirectional air valve.

2. The draining system of claim 1, further comprising:
a thermostat housing structure connected in fluid communication with said coolant conduit, said unidirectional air valve being attached to said thermostat housing structure to dispose said unidirectional air valve in fluid communication with said coolant conduit.

3. The draining system of claim 1, wherein:
said coolant conduit is configured to conduct water in thermal communication with said heat producing portions of said internal combustion engine.

4. The draining system of claim 1, further comprising:
a water pump connected in fluid communication with said coolant conduit for causing liquid coolant to flow through said coolant conduit.

5. The draining system of claim 1, wherein:
said unidirectional air valve is an umbrella-shaped valve.

6. The draining system of claim 1, further comprising:
a vent module shaped to be inserted into said coolant conduit, said vent module being shaped to support said unidirectional air valve in fluid communication with said coolant conduit.

7. The draining system of claim 6, further comprising:
a housing structure disposed in fluid communication with said coolant conduit, said vent module being inserted into said housing structure.

8. The draining system of claim 7, further comprising:
a screen member disposed within said vent module to inhibit debris from flowing into contact with an operative portion of said unidirectional air valve.

9. The draining system of claim 1, wherein:
said unidirectional air valve is responsive to the pressure differential between the pressure within said coolant conduit and the pressure external to said coolant conduit.

10. The draining system of claim 9, wherein:
said unidirectional air valve inhibits fluid from flowing out of said coolant conduit through said unidirectional air valve when said pressure within said coolant conduit is higher than said pressure external to said coolant conduit and allows fluid to flow into said coolant conduit through said unidirectional air valve when said pressure external to said coolant conduit is higher than said pressure within said coolant conduit.

11. An engine coolant draining system, comprising:
an internal combustion engine;
a water conduit disposed at least partially in thermal communication with heat producing portions of said internal combustion engine, said water conduit being configured to conduct water in thermal communication with said heat producing portions of said internal combustion engine;
a unidirectional air valve disposed in fluid communication with said water conduit to inhibit fluid from flowing out of said water conduit through said unidirectional air valve while allowing fluid to flow into said water conduit through said unidirectional air valve; and
a housing structure connected in fluid communication with said water conduit, said unidirectional air valve being attached to said housing structure to dispose said unidirectional air valve in fluid communication with said water conduit.

12. The draining system of claim 11, further comprising:
a water pump connected in fluid communication with said water conduit for causing liquid water to flow through said water conduit.

13. The draining system of claim 12, wherein:
said unidirectional air valve is an umbrella-shaped valve.

14. The draining system of claim 13, further comprising:
a vent module shaped to be inserted into said water conduit, said vent module being shaped to support said unidirectional air valve in fluid communication with said water conduit; and
a screen member disposed within said vent module to inhibit debris from flowing into contact with an operative portion of said unidirectional air valve.

15. The draining system of claim 14, wherein:
said unidirectional air valve is responsive to the pressure differential between the pressure within said water conduit and the pressure external to said water conduit.

16. The draining system of claim 15, wherein:
said unidirectional air valve inhibits fluid from flowing out of said water conduit through said unidirectional air valve when said pressure within said water conduit is higher than said pressure external to said water conduit and allows fluid to flow into said water conduit through said unidirectional air valve when said pressure external to said water conduit is higher than said pressure within said water conduit.

17. An engine coolant draining system, comprising:
an internal combustion engine;
a water conduit disposed at least partially in thermal communication with heat producing portions of said internal combustion engine, said water conduit being configured to conduct water in thermal communication with said heat producing portions of said internal combustion engine;
a unidirectional air valve disposed in fluid communication with said water conduit to inhibit fluid from flowing out of said water conduit through said unidirectional air valve while allowing fluid to flow into said water conduit through said unidirectional air valve;
a housing structure connected in fluid communication with said water conduit, said unidirectional air valve being attached to said housing structure to dispose said unidirectional air valve in fluid communication with said water conduit; and
a vent module shaped to be inserted into said water conduit, said vent module being shaped to support said unidirectional air valve in fluid communication with said water conduit.

18. The draining system of claim 17, wherein:
said unidirectional air valve is an umbrella-shaped valve.

19. The draining system of claim 18, wherein:
said unidirectional air valve is responsive to the pressure differential between the pressure within said water conduit and the pressure external to said water conduit.

20. The draining system of claim 19, wherein:
said unidirectional air valve inhibits fluid from flowing out of said water conduit through said unidirectional air valve when said pressure within said water conduit is higher than said pressure external to said water conduit and allows fluid to flow into said water conduit through said unidirectional air valve when said pressure external to said water conduit is higher than said pressure within said water conduit.

* * * * *